(12) United States Patent
Luo et al.

(10) Patent No.: US 12,236,641 B2
(45) Date of Patent: Feb. 25, 2025

(54) VEHICLE WHEELS ALIGNMENT SYSTEM USING IMAGE ACQUISITION SENSOR AND VEHICLE WHEELS ALIGNMENT METHOD

(71) Applicant: Autel Intelligent Technology Corp., Ltd., Shenzhen (CN)

(72) Inventors: Wenhui Luo, Shenzhen (CN); Lianjun Liu, Shenzhen (CN)

(73) Assignee: AUTEL INTELLIGENT TECHNOLOGY CORP., LTD., Shenzhen (CN)

( * ) Notice: Subject to any disclaimer, the term of this patent is extended or adjusted under 35 U.S.C. 154(b) by 54 days.

(21) Appl. No.: 18/067,716

(22) Filed: Dec. 18, 2022

(65) Prior Publication Data

US 2023/0124731 A1 Apr. 20, 2023

Related U.S. Application Data

(63) Continuation of application No. PCT/CN2021/100795, filed on Jun. 18, 2021.

(30) Foreign Application Priority Data

Jun. 19, 2020 (CN) .......................... 202010567583.1

(51) Int. Cl.
  *G06T 7/80* (2017.01)
  *G01B 11/275* (2006.01)
  *G06T 7/70* (2017.01)

(52) U.S. Cl.
  CPC ............ *G06T 7/80* (2017.01); *G01B 11/2755* (2013.01); *G06T 7/70* (2017.01); *G01B 2210/12* (2013.01);

(Continued)

(58) Field of Classification Search
  CPC ... G06T 7/80; G06T 7/70; G06T 2207/30252; G01B 11/2755; G01B 2210/12;

(Continued)

(56) References Cited

U.S. PATENT DOCUMENTS

| 10,347,006 B2 | 7/2019 | Kunert et al. |
| 2002/0027651 A1* | 3/2002 | Jackson ............. G01B 11/2755 356/139.09 |

(Continued)

FOREIGN PATENT DOCUMENTS

| CN | 207095542 U | 3/2018 |
| CN | 207991830 U | 10/2018 |

(Continued)

OTHER PUBLICATIONS

The extended European search report of EP application No. 21826059.4 issued on Nov. 3, 2023.

(Continued)

*Primary Examiner* — Dramos Kalapodas
(74) *Attorney, Agent, or Firm* — Andrew C. Cheng

(57) ABSTRACT

A vehicle detection system includes a support, machine vision modules, a failure sensor, and a controller. Each machine vision module includes image acquisition devices each including s an image acquisition sensor for obtaining related parameters of hardware to be detected of a vehicle. The failure sensor is used for acquiring position change information of the image acquisition sensor and outputting a motion parameter signal comprising the position change information. The controller is used for determining, according to the motion parameter signal, whether the position of the image acquisition sensor needs to be calibrated. In the using process of the vehicle detection system, the controller can determine in real time whether the position of the image acquisition sensor needs to be calibrated, so as to avoid a (Continued)

miscorrection caused by detecting and correcting the vehicle without precalibration after the measurement and calculation precision of the vehicle detection system is reduced.

18 Claims, 3 Drawing Sheets

(52) U.S. Cl.
  CPC ............... *G01B 2210/143* (2013.01); *G06T 2207/30252* (2013.01)

(58) Field of Classification Search
  CPC .......... G01B 2210/143; F16M 11/046; F16M 11/18; F16M 11/42; F16M 11/04; H04N 17/002; H04N 23/695; G07C 5/085
  See application file for complete search history.

(56) References Cited

U.S. PATENT DOCUMENTS

| | | | | |
|---|---|---|---|---|
| 2009/0027662 A1* | 1/2009 | Rogers | ............... | G01B 11/2755 356/139.09 |
| 2010/0149526 A1* | 6/2010 | Rogers | ............... | G01B 11/2755 356/139.09 |
| 2012/0026293 A1* | 2/2012 | Gruetzmann | ........ | G01B 11/275 348/46 |
| 2017/0097229 A1* | 4/2017 | Rogers | ............... | G01B 11/2755 |
| 2017/0097230 A1* | 4/2017 | Rogers | ....................... | B60S 5/00 |
| 2019/0316901 A1* | 10/2019 | Rogers | ............... | G01B 11/2755 |
| 2020/0049494 A1* | 2/2020 | Rogers | .................... | B60R 11/04 |
| 2020/0249014 A1* | 8/2020 | Rogers | ................. | G01B 11/275 |

FOREIGN PATENT DOCUMENTS

| | | |
|---|---|---|
| CN | 109827784 A | 5/2019 |
| CN | 111599036 A | 8/2020 |
| KR | 101367778 B1 | 3/2014 |

OTHER PUBLICATIONS

International Search Report of PCT Patent Application No. PCT/CN2021/100795 issued on Sep. 26, 2021.

* cited by examiner

VEHICLE WHEELS ALIGNMENT SYSTEM USING IMAGE ACQUISITION SENSOR AND VEHICLE WHEELS ALIGNMENT METHOD

CROSS-REFERENCE TO RELATED APPLICATIONS

The present application is a continuation of International Patent Application No. PCT/CN2021/100795 filed on Jun. 18, 2021, which claims priority to the Chinese patent application No. 202010567583.1 entitled "vehicle detection system and vehicle detection method" filed on Jun. 19, 2020, to the China National Intellectual Property Administration, the entire contents of which are incorporated herein by reference.

TECHNICAL FIELD

The present application relates to the technical field of automobile detection, and more particularly to a vehicle detection system and a vehicle detection method.

BACKGROUND ART

With the development of science and technology and the improvement of living standards, the number of residents' cars is growing rapidly, and cars have become the most popular means of transportation for residents. After a long-term and long-range driving, the wheels or the hardware on the Advanced Driver Assistant System (hereinafter referred to as ADAS) may be subjected to position shift or performance degradation relative to factory settings. At present, the detection of wheel positioning parameters is generally realized by a four-wheel aligner, and the hardware in ADAS is calibrated and detected by automobile calibration equipment, so as to reasonably calibrate the wheels and the hardware in the ADAS, thereby ensuring that the owner can drive safely.

In carrying out the present invention, the inventors of the present invention come to the conclusion that: when the current four-wheel aligner or calibration equipment is disturbed by serious external forces, such as vibration, impact or strike, etc. its calculation precision will decrease, or even fail; the user or maintenance personnel cannot timely acquire the information of measurement and calculation precision decrease or failure, which will lead to the miscorrection of the wheel or the hardware in the ADAS, and when in severe conditions, may cause serious traffic accidents.

SUMMARY OF THE INVENTION

Embodiments of the present invention are intended to provide a vehicle detection system and a vehicle detection method so as to solve the technical problem of the miscorrection of a vehicle after the current four-wheel aligner or calibration equipment is interfered.

The embodiments of the present invention solve the technical problems by adopting the following technical solutions:
a vehicle detection system, comprising:
a support;
a machine vision module mounted to the support, wherein the machine vision module comprises at least one image acquisition device, a position of the image acquisition device relative to the support is fixed, and the image acquisition device comprises an image acquisition sensor for acquiring an image having relevant parameters of hardware to be detected on a vehicle;
a failure sensor for acquiring position change information about the image acquisition sensor and outputting a motion parameter signal comprising the position change information:
and a controller electrically connected to the failure sensor for determining whether the position of the image acquisition sensor needs to be calibrated according to the motion parameter signal.

As a further improvement of the above technical solution, the failure sensor is fixed to the image acquisition sensor.

As a further improvement of the above technical solution, the failure sensor is integrated inside the image acquisition device.

As a further improvement of the above technical solution, the failure sensor includes at least one of an acceleration sensor, a pressure sensor, and a gyroscope.

As a further improvement of the above technical solution, the support comprises:
a base, a bottom of the base comprising a driving wheel;
a vertical frame assembly mounted to the base and extending in the vertical direction; and
a cross beam assembly mounted to the vertical frame assembly, the cross beam assembly and the vertical frame assembly slidingly fit in the vertical direction, and the image acquisition device being mounted to the cross beam assembly.

As a further improvement of the above technical solution, the support comprises a vertical frame assembly and a cross beam assembly;
the cross beam assembly is mounted to the vertical frame assembly, the cross beam assembly and the vertical frame assembly are slidingly fit in the vertical direction, and the image acquisition device is mounted to the cross beam assembly.

As a further improvement of the above technical solution, the machine vision module comprises two of the image acquisition devices provided at intervals on the cross beam assembly;
the controller is housed within the vertical frame assembly or the cross beam assembly.

As a further improvement of the above-mentioned technical solution, an associated image acquisition device and an associated target are further included;
wherein the machine vision module comprises two image acquisition devices, the associated image acquisition device is fixed to one of the two image acquisition devices and is electrically connected to the controller, the associated target is fixed to the other one of the two image acquisition devices, the associated image acquisition device is used for acquiring position information about the associated target relative to the associated image acquisition device, and the associated target is a planar target.

As a further improvement of the above-mentioned technical solution, one image acquisition device comprises at least two image acquisition sensors, the failure sensor being fixed to the image acquisition sensor and one image acquisition sensor corresponding to one failure sensor.

As a further improvement of the above-mentioned technical solution, the machine vision module further comprises an image processor, the image processor is respectively electrically connected to the image acquisition sensor and the controller, and the image processor is integrally provided with the controller.

As a further improvement of the above-mentioned technical solution, an output module electrically connected to the controller is further included, wherein the output module is used for outputting a determination result of the controller;

the output module comprises a display device and/or a sound output device.

As a further improvement of the above-mentioned technical solution, a target to be detected is further included, the target to be detected being used for being mounted to a wheel and the image acquisition device being used for acquiring an image of the target to be detected.

As a further improvement of the above technical solution, the controller is used for determining, according to the motion parameter signal, whether the position of the image acquisition sensor needs to be calibrated, comprising:

the controller being used for executing a first intervention treatment when the motion parameter signal is greater than a first preset threshold.

As a further improvement of the above technical solution, the first intervention treatment comprises: locking a detection function of the vehicle detection system;

and/or the first intervention treatment comprises: controlling the output module to output a first warning signal.

As a further improvement of the above technical solution, the controller is used for determining, according to the motion parameter signal, whether the position of the image acquisition sensor needs to be calibrated, comprising:

the controller being used for executing a second intervention treatment when the motion parameter signal is greater than a second preset threshold and less than or equal to the first preset threshold.

As a further improvement of the above technical solution, the second intervention treatment comprises: controlling the output module to output a second warning signal.

As a further improvement of the above technical solution, the number of the controllers is the same as that of the failure sensors, one controller being correspondingly electrically connected to one failure sensor, and both the controller and the failure sensor being integrated into a corresponding image acquisition device.

As a further improvement of the above technical solution, an output module is further included, wherein the output module corresponds to the image acquisition device in a one-to-one correspondence, the output module is integrated into a corresponding image acquisition device and electrically connected to the controller, and the output module is used to output the determination result of the controller.

The embodiments of the present invention solve the technical problems by further adopting the following technical solutions:

a vehicle detection method applied to the vehicle detection system. The method comprises steps of:

receiving a motion parameter signal comprising position change information of the image acquisition sensor sent by the failure sensor while controlling the image acquisition device to detect the vehicle:

and determining whether the position of the image acquisition sensor needs to be calibrated according to the motion parameter signal, and if so, executing an intervention treatment.

As a further improvement of the above technical solution, determining whether the position of the image acquisition sensor needs to be calibrated, and if so, executing the intervention treatment, comprise:

executing a first intervention treatment when the motion parameter signal is greater than the first preset threshold.

As a further improvement of the above technical solution, the vehicle detection system further includes an output module electrically connected to the controller;

the first intervention treatment comprises: locking a detection function of the vehicle detection system;

and/or the first intervention treatment comprises: controlling the output module to output a first warning signal.

As a further improvement of the above technical solution, determining whether the position of the image acquisition sensor needs to be calibrated, and if so, executing the intervention treatment, further comprise:

executing a second intervention treatment when the motion parameter signal is greater than a second preset threshold and less than or equal to the first preset threshold.

As a further improvement of the above technical solution, the second intervention treatment comprises: controlling the output module to output a second warning signal.

The advantageous effects of the present invention are as follows.

Embodiments of the present invention provide a vehicle detection system that includes a support, a machine vision module, a failure sensor, and a controller. The machine vision module comprises at least one image acquisition device, the image acquisition device comprising an image acquisition sensor, and the image acquisition sensor being used for acquiring relevant parameters of hardware to be detected on the vehicle. The failure sensor is used for acquiring the position change information of the image acquisition sensor and outputting a motion parameter signal including the position change information. The controller is used for determining whether the position of the image acquisition sensor needs to be calibrated according to the motion parameter signal.

Then, in the using process of the vehicle detection system, the controller can determine in real time whether the position of the image sensor needs to be calibrated, so as to avoid a miscorrection caused by detecting and correcting the vehicle without precalibration after the measurement and calculation precision of the vehicle detection system is reduced, thereby avoiding the occurrence of dangerous accidents.

BRIEF DESCRIPTION OF THE DRAWINGS

One or more embodiments are illustrated by way of examples with the accompanying drawings. The illustrative examples are not to be construed as limiting the embodiments. In the drawings, elements having the same reference numeral designations represent like elements, and unless otherwise specified, the drawings are not to scale.

DETAILED DESCRIPTION OF THE INVENTION

In order that the present invention may be readily understood, a more particular description of the invention will be rendered by reference to specific embodiments and the accompanying drawings. It should be noted that when an element is referred to as being "secured"/"fixed"/"mounted" to another element, it can be directly on the other element or one or more intermediate elements may be present between the elements. When one element is referred to as being "connected" to another element, it can be directly connected to the other element or one or more intermediate elements may be present between the elements. The terms "vertical", "horizontal", "left", "right", "inner", "outer", and the like are used herein for descriptive purposes only.

Unless defined otherwise, all technical and scientific terms used in the description have the same meaning as commonly understood by one of ordinary skill in the art to which this invention belongs. The terms used in the description of the present invention are for the purpose of describing specific embodiments only and are not intended to be limiting of the present invention. As used in the description, the term "and/or" includes any and all combinations of one or more of the associated listed items.

Furthermore, the technical features involved in various embodiments of the present invention described below can be combined as long as they do not conflict with each other.

In this description, "mounting" includes welding, screwing, clamping, gluing, etc. to fix or restrain a certain element or device in a specific position or place. The element or device may either be fixed in a specific position or place, or may be movable within a limited range. The element or device may or may not be detachable after being fixed or restrained in the specific position or place, and is not limited in the embodiments of the present invention.

Figure 1:
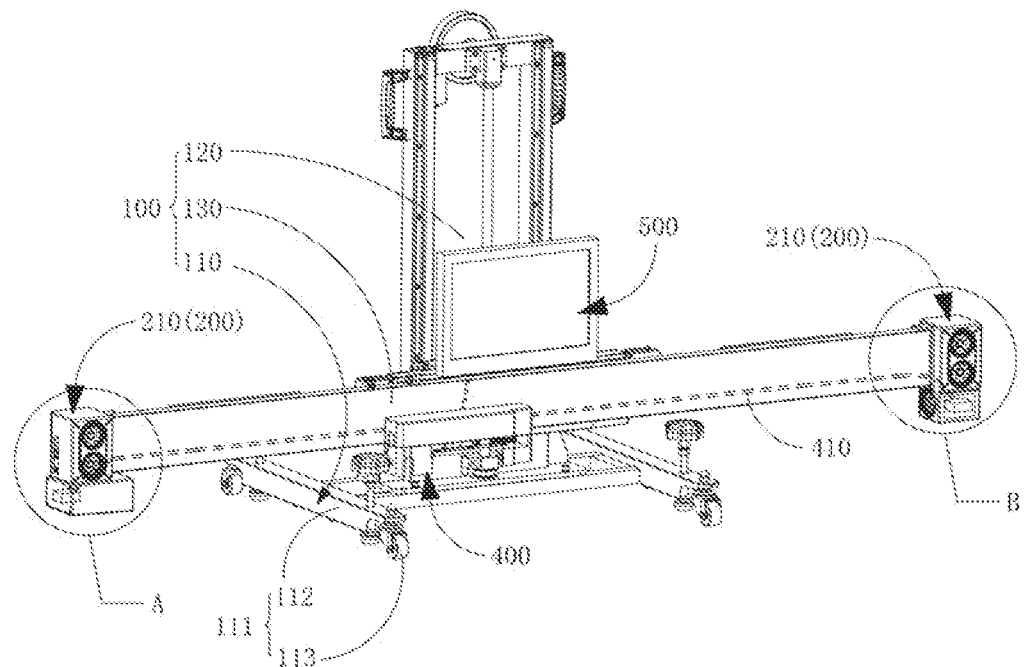
FIG. 1 is a schematic perspective view of a vehicle detection system according to one of the embodiments of the present invention.
Figures 2, 3:
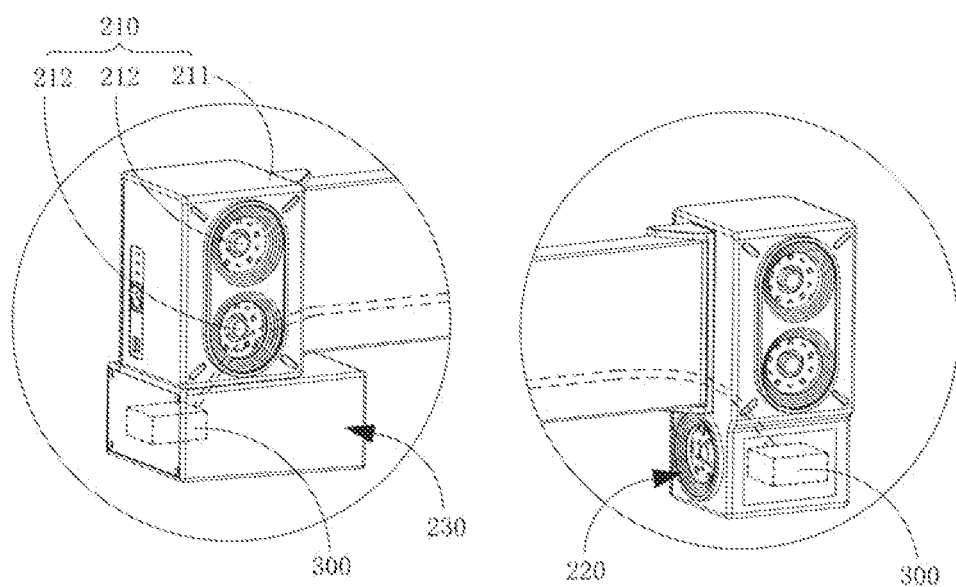
FIG. 2 is a partially enlarged schematic view at A in FIG. 1.
FIG. 3 is a partially enlarged schematic view at B in FIG. 1.

Referring now to FIGS. 1-3, which respectively show a schematic perspective view of a vehicle detection system provided by one of the embodiments of the present invention, a partially enlarged schematic view at A. and a partially enlarged schematic view at B. The vehicle detection system comprises a support 100, a machine vision module 200, a failure sensor 300, and a controller 400. The support 100 is used for mounting and supporting various structures such as the machine vision module 200, the failure sensor 300, and the controller 400, etc. The machine vision module 200 is mounted to the support 100 and includes at least one image acquisition device 210 that is fixed in position relative to the support 100; the image acquisition device 210 includes an image acquisition sensor 212 for acquiring an image having related parameters of hardware to be detected of a vehicle to be detected (not shown). The failure sensor 300 is used for acquiring the position change information of the image acquisition sensor 212 and outputting a motion parameter signal comprising the position change information. The controller 400 is electrically connected to the failure sensor 300 for determining whether the position of the image acquisition sensor 212 needs to be calibrated based on the motion parameter signal output by the failure sensor 300. It is worth noting that "electrically connected" in this embodiment means that the communication of electrical signals between two structures can be realized either by a wired electrical connection via a cable or by a radio connection via Bluetooth, WiFi module, etc.

With respect to the support 100 described above, and with particular reference to FIG. 1, a base 110, a vertical frame assembly 120, and a cross beam assembly 130 are included. The base 110 includes a main body 112 having an I-shape as a whole and several driving wheels 113 mounted to the bottom of the main body 112. The vertical frame assembly 120 is mounted to the top of the main body of the base 110 and extends in the vertical direction as shown. Mounted to the vertical frame assembly 120 and extending in the illustrated horizontal direction is a cross beam assembly 130 that is slidingly fitted with the vertical frame assembly 120 along the vertical direction shown in the figure. The cross beam assembly 130 can be moved or stopped in the illustrated vertical direction in a timely manner driven by an external corresponding driving assembly.

The machine vision module 200 described above, with particular reference to FIGS. 2 and 3 in conjunction with FIG. 1, includes at least two image acquisition devices 210 mounted to the cross beam assembly 130 in a fixed position relative to the support 100. In the present embodiment, the number of the image acquisition devices 210 is two, and the two image acquisition devices 210 are arranged at intervals on the cross beam assembly 130; it could be understood that in other embodiments of the present invention, the number of image acquisition devices 210 may be other numbers, such as one, or three and more. Alternatively, the image acquisition device 210 is detachably fixed to the cross beam assembly 130 and is switchable between a locked state and an unlocked state: in the locked state, the image acquisition device 210 is fixed relative to the support 100, and in the unlocked state, the image acquisition device 210 can be adjusted in the position either by a user or a maintenance person manually, or under the action of an external driving mechanism, so as to adapt to the detection requirements of different vehicle types.

The image acquisition device 210 includes a housing 211 and an image acquisition sensor 212 mounted to the housing 211. The housing 211 is fixed to the cross beam assembly 130 by means of a detachable connection, and the image acquisition sensor 212 is mounted on the housing 211 and has the function of acquiring an external image; in the present embodiment, the image acquisition sensor 212 is specifically used for acquiring an image having relevant parameters of hardware to be detected of a wheel on a vehicle to be detected, or a target mounted on the vehicle, etc.

With respect to the above-mentioned failure sensor 300, please continue to refer to FIGS. 2 and 3 and at the same time referring to FIG. 1, the failure sensor 300 is relatively fixed in position with the image acquisition sensor 212 in the image acquisition device 210, and is used for detecting the position change information of the image acquisition sensor 212 and outputting a motion parameter signal having the position change information to the controller 400. Alternatively, the failure sensor 300 comprises at least one of an acceleration sensor, a pressure sensor, and a gyroscope; it could be understood that the failure sensor 300 is not limited to the selection among the above-described sensors, and may be other sensors as long as it is capable of detecting the position change information of the image acquisition sensor and outputting a motion parameter signal having the position change information.

In some embodiments, the failure sensor 300 is fixed to the housing 211. Specifically, in the same image acquisition device 210, the image acquisition sensor 212 is fixed in position with respect to the housing 211, and the failure sensor 300 indirectly acquires the position change information of the image acquisition sensor 212 by detecting the position change information of the housing 211. The failure sensor 300 may be fixed to the outer surface of the housing 211, or may be integrated into the interior of the image acquisition device 210, such as the inner surface of the housing 211 or the internal circuit board of the image acquisition device 210.

In some embodiments, the failure sensor 300 is fixed to the image acquisition sensor 212 and directly detects position change information of the image acquisition sensor 212. The number of image acquisition sensors 212 in the same image acquisition device 210 can be one or more, and each image acquisition sensor 212 is fixed relative to the housing 211; or the number of the image acquisition sensors 212 in the same image acquisition device 210 is one or more, and the position of each image acquisition sensor 212 relative to the housing 211 may change such as angular displacement, etc. and at this time, the failure sensor 300 corresponds to the image acquisition sensors 212 one-to-one; alternatively, the number of the image capturing sensors 212 in the same image acquisition device 210 is two or more, wherein some of the image capturing sensors 212 are fixed in position relative to the housing 211, and the position of some of the image capturing sensors 212 relative to the housing 211 can be changed such as angular displacement, etc. and then each image capturing sensor which can be changed in displacement corresponds to a failure sensor 300.

With respect to the controller 400 described above, and with particular reference to FIG. 1 in conjunction with FIGS. 2 and 3, the controller 400 is in electrical communication with the image acquisition device 210 and the failure sensor 300, respectively. In this embodiment, the controller 400 is an independent structure that is mounted to the base 110 and electrically connected to failure sensor 300 via the cable 410. It could be understood that in some other embodiments of the present invention, the controller 400 may be housed within vertical frame assembly 120 or the cross beam assembly 130, or integrated within the image acquisition device 210. The controller 400 is used for receiving an image having relevant parameters of the hardware to be detected collected by the image acquisition device 210 and parsing the same to obtain a detection result. The controller 400 is also used for receiving the motion parameter signal output by the failure sensor 300 and determining whether the position of the image acquisition sensor 212 needs to be calibrated based on the motion parameter signal. Specifically, the controller 400 is used for executing a first intervention treatment when the motion parameter signal is greater than a first preset threshold; the first preset threshold is one reference value preset by the controller 400 itself, and when the motion parameter signal is higher than the first threshold, the detection precision of the vehicle detection system is seriously disturbed, and the detection result is obviously abnormal. Alternatively, the first intervention treatment comprises: locking the detection function of the vehicle detection system. Then, the user can know that the vehicle detection system is in an unstable state through the first intervention treatment, then correct the vehicle detection system by reasonable means, and then unlock the detection function of the vehicle detection system, so as to avoid a safety accident caused by the vehicle being corrected under the wrong detection precision.

In order to enable a user to, when the detection precision of the vehicle detection system is disturbed and thus affects the detection function, quickly and clearly know the abnormal interference degree of the vehicle detection system through vision and hearing so as to timely correct the vehicle detection system, the vehicle detection system further comprises an output module 500. Specifically, referring to FIG. 1 in conjunction with FIGS. 2 and 3, the output module 500 is electrically connected to the controller 400 via another cable 410 for outputting a determination result from the controller 400 about whether the position of the image acquisition sensor 212 needs to be calibrated. In the present embodiment, the first intervention treatment executed by the controller 400 further includes: controlling the output module 500 to output a first warning signal. Alternatively, the output module 500 comprises a display device, and the above-mentioned first warning signal comprises visual information such as an image, characters, numbers, symbols, etc. output by the display device; for example, in some implementation modes, the first alert signal includes the following textual content: "the detection system is abnormal, please calibrate the position of image acquisition sensor in time". Further, alternatively, the output module 500 further comprises a sound output device, and the above-mentioned first warning signal further comprises a sound signal output by the sound output device; for example, in some implementation modes, the first warning signal includes the following sound content: "the detection system is abnormal, please calibrate the position of image acquisition sensor in time". Still further, alternatively, the output module 500 is a display that includes a display device and a sound output device at the same time. It could be understood that in other embodiments of the invention, the output module may also comprise only any one of a display device and a sound output device.

Further, the controller is used for determining, according to the motion parameter signal, whether the position of the image acquisition sensor needs to be calibrated, comprising: the controller 400 being used for executing a second intervention treatment when the above-mentioned motion parameter signal is greater than a second pre-set threshold and is less than or equal to the first preset threshold; and for not executing any intervention treatment when the motion parameter signal is less than or equal to the second parameter threshold. The second preset threshold is one value pre-set by the controller 400 itself, and is less than the first preset threshold; when the above-mentioned motion parameter signal is greater than the second preset threshold and is less than or equal to the first preset threshold, the detection precision of the vehicle detection system is slightly affected, and the detection result has little difference compared with the actual situation and thus can be used; when the above-mentioned motion parameter signal is less than or equal to the second preset threshold, the detection precision of the vehicle detection system is unaffected or minimally affected without affecting the specific detection function. Alternatively, the second intervention treatment comprises: controlling the output module 500 to output a second warning signal. Similar to the first warning signal, the second warning signal may be an image signal output by the display device or a sound signal output by the sound output device, but may also be a signal output by a combination of the display device and the sound output device. When the output module 500 outputs the second warning signal, the user can clearly know the degree to which the detection is affected caused by the vehicle detection system subjected to the impact, thereby deciding whether to calibrate the vehicle detection system according to actual requirements.

It should be understood that, even though, according to the present embodiment, the image acquisition device 210, the failure sensor 300, the controller 400, and the output module 500 are structures configured independently, the present invention is not limited thereto. For example, in some other embodiments of the present invention, the number of controllers 400 is the same as that of the failure sensor 300, a controller 400 is correspondingly electrically connected to a failure sensor 300, and the controller 400 and the failure sensor 300 are both integrated into the corresponding image acquisition device 210; as another example, the controller 400, the failure sensor 300, and the output module 500 have the same number, a controller 400 is correspondingly electrically connected to a failure sensor 300 and an output module 500, and the corresponding controller 400, failure sensor 300, and the output module 500 are all integrated into the corresponding image acquisition device 210.

Figure 4:
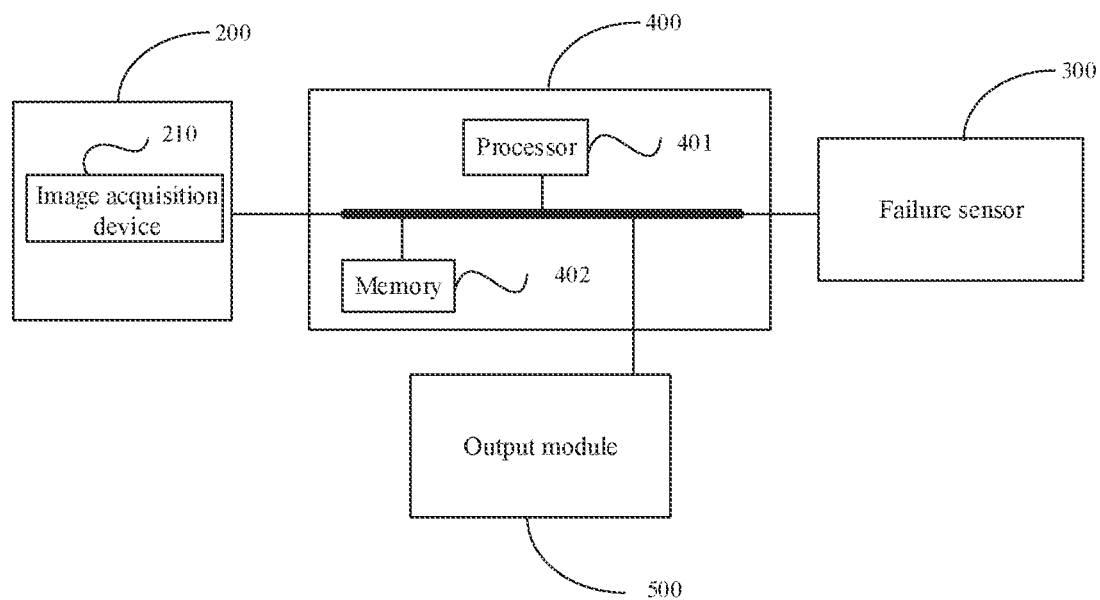
FIG. 4 is a schematic view of an electrical connection principle between the machine vision module, the failure sensor, the output module, and the controller.

It is worth noting that as central control equipment of the vehicle detection system, the controller 400, as shown in FIG. 4, includes a processor 401 and a memory 402, which may be connected via a bus or otherwise. The image acquisition device 210, the failure sensor 300, and the output module 500 in the machine vision module 200 are all connected to a bus.

The memory 402 is a non-volatile computer-readable storage medium that can be used to store non-volatile software programs, non-volatile computer-executable programs, and modules. The processor 401 executes the steps executed by the controller described above by executing non-volatile software programs, instructions, and modules stored in memory 402. The memory 402 may comprise a program storage area and a data storage area. The program storage area may store an operating system and an application program required by at least one function; the data storage area may store data output from the image acquisition device 210, the image processor, the failure sensor 300, and the like. In addition, the memory 402 may include high speed random access memory and may also include non-volatile memory, such as at least one disc memory device, flash memory device, or other non-volatile solid state memory device.

In some embodiments, the memory 402 may alternatively include a memory remotely provided with respect to the processor 401. The remote memory may be connected to the processor 401 via a network. Examples of such networks include, but are not limited to, the Internet, intranets, local area networks, mobile communication networks, and combinations thereof.

The program instructions/modules are stored in the memory 402 and, when executed by one or more processors 401, execute the steps executed by the controller described above.

Furthermore, when the vehicle detection system is applied to the four-wheel positioning of a vehicle, one of the image acquisition devices 210 is used for acquiring an image having relevant parameters of a left front wheel and a left rear wheel of the vehicle to be detected, and the other image acquisition device 210 is used for acquiring an image having relevant parameters of a right front wheel and a right rear wheel of the vehicle to be detected. In order to facilitate establishing the relationship between the relevant parameters respectively acquired by the two image acquisition devices 210, the machine vision module 200 further comprises an associated image acquisition device 220 and an associated target 230. Specifically, in conjunction with FIGS. 1-3, the associated image acquisition device 220 is fixed to one of the two image acquisition devices 210 and is electrically connected to the controller 400, and the associated target 230 is fixed to the other of the two image acquisition devices. The associated image acquisition device 220 is used for acquiring the position information about the associated target 230 relative to itself so as to establish a mutual position relationship between the two image acquisition devices 210, and then obtaining the relation between the positional relationship between the left front wheel, the left rear wheel, the rear front wheel, and the right rear wheel of the vehicle to be detected, and other relevant parameters. Alternatively, the associated target is a planar target.

Alternatively, the failure sensor 300 is built into the associated image acquisition device 220 and the associated target 230. Specifically, a failure sensor 300 is built into the associated image acquisition device 220 and a failure sensor 300 is built into the associated target 230.

Further, considering that the image acquisition device 210 directly acquires the image with a wheel to obtain the relevant parameters of the wheel, a relatively rigorous and precise algorithm is required to realize the analysis of the wheel parameters. To overcome this drawback, the vehicle detection system also includes a target to be detected (not shown). Specifically, the target to be detected is used for being mounted on a wheel of a vehicle to be detected, the image acquisition device 210 is used for acquiring an image of the target to be detected, the image acquisition device 210 can identify the target to be detected more simply than directly identifying the wheel itself, and the controller can calculate relevant parameters of the wheel from the position of the target to be detected in the image and analyze the detection result.

Further, the machine vision module 200 further comprises an image processor (not shown), which is electrically connected to the image acquisition device 210 and the controller 400 respectively, and is used for receiving an image having the relevant parameters of the hardware to be detected acquired by two image acquisition devices 210 and an image having the associated target 230 acquired by the associated image acquisition device 220 and performing optimization treatments such as noise reduction, etc. so as to improve the rate and accuracy of the analysis by the controller 400. Alternatively, the image processor and the controller 400 are integrally provided: it could be understood that in other embodiments of the present invention, the image processor may also be provided independently from the controller 400 or integrated within the image acquisition device 210.

An embodiment of the present invention provides a vehicle detection system that includes a support 100, a machine vision module 200, a failure sensing module 300, and a controller 400. The machine vision module 200 comprises at least one image acquisition device 210 comprising an image acquisition sensor 212 for acquiring relevant parameters of the hardware to be detected on the vehicle. The failure sensor 300 is used to acquire the position change information of the image acquisition sensor 212, and outputs a motion parameter signal including the position change information to the controller 400. The controller 400 is electrically connected to the failure sensor 300, and is used for determining whether the position of the image acquisition sensor needs to be calibrated according to the motion parameter signal, so as to avoid a miscorrection caused by detecting and correcting the vehicle without precalibration after the detection precision of the vehicle detection system is significantly reduced, thereby avoiding the occurrence of dangerous accidents.

In addition, the vehicle detection system further comprises an output module 500. The vehicle detection system can lock the detection function of the vehicle detection system according to the degree of impact on the image acquisition sensor 212 and the degree of reduced detection precision, so as to warn a user to correct the vehicle detection system in time; it is also possible to output different warning signals or no warning signal through the output module 500, so that the user can know the affected degree of the detection precision of the vehicle detection system in time, thereby prompting the user to correct the vehicle detection system in time.

Figure 5:
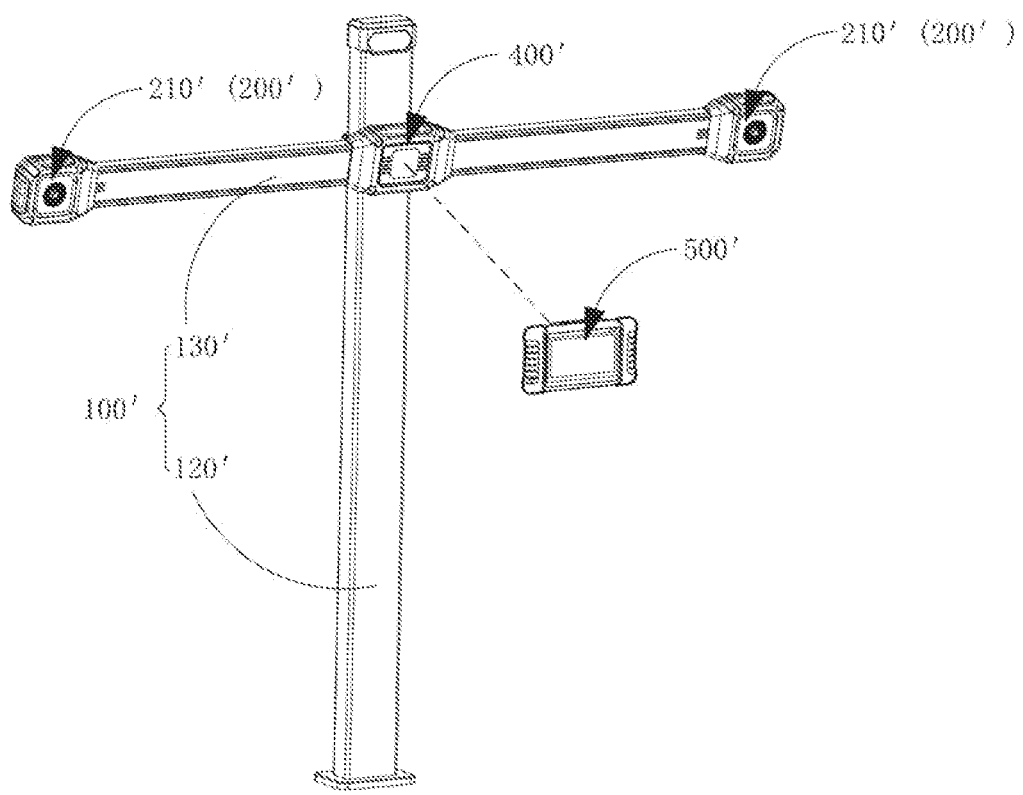
FIG. 5 is a schematic perspective view of a vehicle detection system according to another embodiment of the present invention.

Based on the same inventive concept, the present invention also provides another vehicle detection system. With particular reference to FIG. 5, there is shown a schematic perspective view of a vehicle detection system in the present embodiment, including a support 100', a machine vision module 200', a failure sensor (not shown), a controller 400', and an output module 500'. Among other things, the support 100' includes a vertical frame assembly 120' and a cross beam assembly 130'. The cross beam assembly 130' is fixed to the vertical frame assembly 120'. The machine vision module 200' includes at least one image acquisition device 210' mounted to the cross beam assembly 130'. The failure sensor is built into the image acquisition device 210'. The controller 400' is mounted to the cross beam assembly 130'. The output module 500 is a mobile terminal such as a mobile phone, a tablet, etc. and is electrically connected to the controller 400 in a wireless communication manner.

In order to facilitate the distinction from the vehicle detection system in the first embodiment, the vehicle detection system in the first embodiment is hereinafter referred to as a first vehicle detection system, and similarly, the vehicle detection system in the present embodiment is referred to as a second vehicle detection system. With reference to FIGS. 1 to 5, the second vehicle detection system and the first vehicle detection system have substantially the same structural composition, and the two differ from each other mainly in that:

the support 100 in the first vehicle detection system comprises a base 110, a vertical frame assembly 120, and a cross beam assembly 130, wherein the base 110 comprises a driving wheel 111 so that the first vehicle detection system can move flexibly in the whole detection process, and is suitable for four-wheel positioning of a vehicle to be detected or the calibration of hardware in ADAS: the output module 500 is connected to the controller 400 via a cable 410:

the support 100' in the second vehicle detection system only comprises a vertical frame assembly 120' and a cross beam assembly 130', wherein the bottom of the vertical frame assembly 120' is used for fixing to a workbench or the ground during the detection so that the second vehicle detection system is suitable for four-wheel positioning of a vehicle to be detected; the output module 500' is wirelessly connected to the controller 400'.

It can be seen therefrom that the scope of application of the first vehicle detection system is wide, and the scope of application of the second vehicle detection system is narrow; however, since the output module 500' is a mobile terminal, a user can be away from structures such as the support 100' during use, which has the advantages of convenience and safety.

Figure 6:
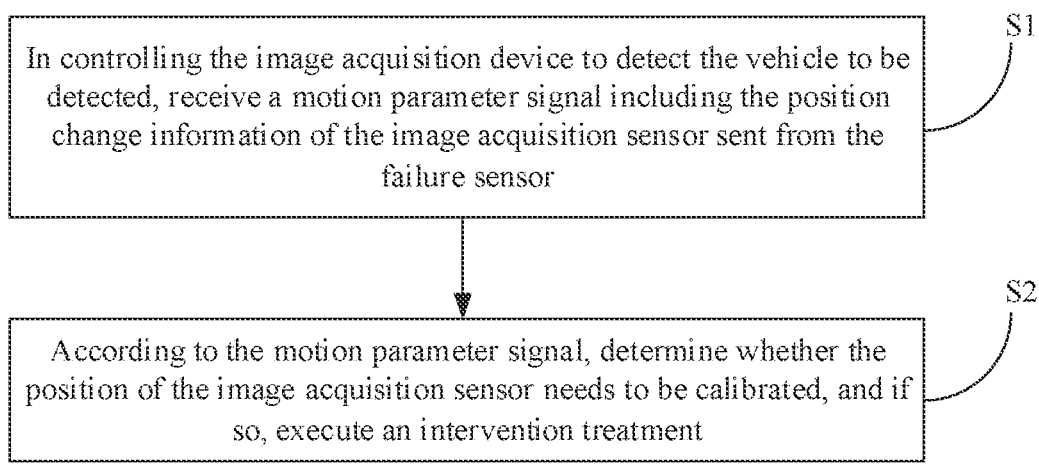
FIG. 6 is a schematic perspective view of a vehicle detection method according to one of the embodiments of the present invention.

Based on the same inventive concept, the present invention also provides a vehicle detection method, which is applied to the vehicle detection system in any of the above-described embodiments. Referring to FIG. 6, which is a schematic flow chart of the vehicle detection method, and in conjunction with FIGS. 1 to 3, the vehicle detection method comprises the steps of:

S1: in controlling the image acquisition device 210 to detect the vehicle to be detected, receiving a motion parameter signal including the position change information of the image acquisition sensor 212 sent from the failure sensor 300. Specifically, the controller 400 is connected to the image acquisition device 210 and the failure sensor 300, respectively; in the process that the controller 400 controls the image acquisition device 210 to acquire relevant parameters of the vehicle, the failure sensor 300 acquires the position change information of the image acquisition sensor 212, and outputs a motion parameter signal including the position change information to the controller 400.

S2: according to the motion parameter signal, determining whether the position of the image acquisition sensor 212 needs to be calibrated, and if so, executing an intervention treatment. Specifically, the controller 400 acquires the motion parameter signal output by the failure sensor 300, and compares the motion parameter signal with an internal preset threshold thereof to determine whether calibration is required; if the calibration is required, the controller 400 performs an intervention treatment, and if not, no intervention treatment is performed. More specifically, the controller 400 is preset with a first preset threshold and a second preset threshold; when the above-mentioned motion parameter signal is greater than the first preset threshold, the detection precision of the vehicle detection system is seriously affected, and the controller 400 executes a first intervention treatment; when the above-mentioned motion parameter signal is greater than the second preset threshold and less than or equal to the first preset threshold, the detection precision of the vehicle detection system is slightly affected, and the controller performs a second intervention treatment; when the motion parameter signal is less than or equal to the second parameter threshold, the detection precision of the vehicle detection system is minimally affected or unaffected, and the controller 400 does not perform any intervention treatment.

Alternatively, the first intervention treatment comprises: a detection function that locks the vehicle detection system: then, the user may be alerted to correct the vehicle detection system in time. Alternatively, the first intervention treatment further comprises: controlling the output module to output a first warning signal; according to the difference in the actual structure of the output module 500, it being the scenario that the first warning signal may be visual information such as images, characters, symbols, etc. and may also be audible information such as sounds, etc.; then, after acquiring the first warning signal, it being possible that the user corrects the vehicle detection system in time to ensure an accurate detection result. It could be understood that, in some embodiments, the first intervention treatment described above may also include only one of the two approaches described above.

Alternatively, the second intervention treatment comprises steps as follows: the controller 400 controls the output module 500 to output a second warning signal; according to the different actual structures of the output module 500, the second warning signal can be visual information such as images, characters, symbols, etc. and can also be audible information such as sounds, etc.; then, after acquiring the second warning signal, the user can correct the vehicle detection system in time to ensure a more accurate detection result.

The vehicle detection method provided by an embodiment of the present invention is used in the detection process of a vehicle to be detected by a vehicle detection system. Since the controller 400 can acquire the position change information about the image acquisition sensor 212 in the image acquisition device 210 in real time via the failure sensor 300, that is to say, the controller 400 can make matching intervention treatment or no intervention treatment according to the position change information about the image acquisition sensor 212 in real time, it is ensured that the vehicle detection system performs a detection process only when the detection precision is good, so as to obtain a reasonable detection result. Therefore, safety accidents caused by the vehicle hardware miscorrection based on the abnormal detection result are avoided.

Based on the same inventive concept, an embodiment of the present invention also provides a non-volatile computer storage medium having stored thereon computer-executable instructions that, when executed by one or more processors, such as one processor 401 in FIG. 4, may cause the one or more processors to execute the steps executed by the controller described above.

Based on the same inventive concept, an embodiment of the present invention also provides a computer program product comprising a computer program stored on a non-volatile computer readable storage medium, the computer program comprising a program instruction that, when executed by the electronic equipment, causes the electronic equipment to execute the steps executed by the controller described above.

Finally, it should be noted that: the above embodiments are merely illustrative of the technical solutions of the present invention, rather than limiting thereto; combinations of technical features in the above embodiments or in different embodiments are also possible within the idea of the present invention, and the steps can be implemented in any order, and there are many other variations of the different aspects of the present invention as described above, which are not provided in detail for the sake of brevity; although the present invention has been described in detail with reference to the foregoing embodiments, those of ordinary skills in the art will appreciate that: the technical solutions disclosed in the above-mentioned embodiments can still be modified, or some of the technical features can be replaced by equivalents; such modifications and substitutions do not depart the essence of corresponding technical solutions from the scope of the technical solutions of various embodiments of the present invention.

The invention claimed is:

1. A vehicle wheels alignment system using image acquisition sensor comprising: a support;
    a machine vision module mounted to the support, wherein the machine vision module comprises at least one image acquisition device, a position of the image acquisition device relative to the support is fixed, and the image acquisition device comprises an image acquisition sensor for acquiring an image having relevant parameters of hardware to be detected related to the wheels on a vehicle;
    a failure sensor for acquiring position change information about the image acquisition sensor and outputting a motion parameter signal comprising the position change information; and
    a controller electrically connected to the failure sensor for determining whether the position of the image acquisition sensor needs to be calibrated according to the motion parameter signal;
    further comprising an associated image acquisition device and an associated target; wherein the machine vision module comprises two image acquisition devices, the associated image acquisition device is fixed to one of the two image acquisition devices and is electrically connected to the controller, the associated target is fixed to the other one of the two image acquisition devices, the associated image acquisition device is used for acquiring position information about the associated target relative to the associated image acquisition device, and then obtaining the relation between the positional relationship between the left front wheel, the left rear wheel, the right front wheel, and the right rear wheel of the vehicle to be detected;
    further comprising an output module electrically connected to the controller, wherein the output module is used for outputting a determination result of the controller; and the output module comprises a display device or a sound output device.

2. The vehicle wheels alignment system according to claim 1, wherein the failure sensor is fixed to the image acquisition sensor.

3. The vehicle wheels alignment system according to claim 2, wherein the failure sensor is integrated within the image acquisition device.

4. The vehicle wheels alignment system according to claim 1, wherein the failure sensor comprises at least one of an acceleration sensor, a pressure sensor, and a gyroscope.

5. The vehicle wheels alignment system according to claim 1, wherein the support comprises: a base, a bottom of the base comprising a driving wheel;
    a vertical frame assembly mounted to the base and extending in a vertical direction; and
    a cross beam assembly mounted to the vertical frame assembly, the cross beam assembly and the vertical frame assembly slidingly fit in the vertical direction, and the image acquisition device being mounted to the cross beam assembly.

6. The vehicle wheels alignment system according to claim 1, wherein the support comprises a vertical frame assembly and a cross beam assembly; the cross beam assembly is mounted to the vertical frame assembly, the cross beam assembly and the vertical frame assembly are slidingly fit in the vertical direction, and the image acquisition device is mounted to the cross beam assembly.

7. The vehicle wheels alignment system according to claim 5, wherein the machine vision module comprises two of the image acquisition devices provided at intervals on the cross beam assembly; the controller is housed within the vertical frame assembly or the cross beam assembly.

8. The vehicle wheels alignment system according to claim 1, wherein one image acquisition device comprises at least two image acquisition sensors, the failure sensor being fixed to the image acquisition sensor and one image acquisition sensor corresponding to one failure sensor.

9. The vehicle wheels alignment system according to claim 1, wherein the machine vision module further comprises an image processor, the image processor being electrically connected to the image acquisition sensor and the controller, respectively, the image processor being used for optimizing the image acquired by the image acquisition sensor, and the image processor being integrally provided with the controller.

10. The vehicle wheels alignment system according to claim 1, further comprising a target to be detected, the target to be detected being used for being mounted to a wheel and the image acquisition device being used for acquiring an image of the target to be detected.

11. The vehicle wheels alignment system according to claim 1, wherein the controller is used for determining whether the position of the image acquisition sensor needs to be calibrated according to the motion parameter signal, comprising: the controller being used for executing a first intervention treatment when the motion parameter signal is greater than a first preset threshold.

12. The vehicle wheels alignment system according to claim 11, wherein the first intervention treatment comprises: locking a detection function of the vehicle detection system; or the first intervention treatment comprises: controlling the output module to output a first warning signal.

13. The vehicle wheels alignment system according to claim 11, wherein the controller is used for determining whether the position of the image acquisition sensor needs to be calibrated according to the motion parameter signal, comprising: the controller being used for executing a second intervention treatment when the motion parameter signal is greater than a second preset threshold and less than or equal to the first preset threshold.

14. The vehicle wheels alignment system according to claim 13, wherein the second intervention treatment comprises: controlling the output module to output a second warning signal.

15. The vehicle wheels alignment system according to claim 1, wherein the number of the controllers is the same as that of the failure sensors, one controller being correspondingly electrically connected to one failure sensor, and both the controller and the failure sensor being integrated into a corresponding image acquisition device.

16. The vehicle wheels alignment system according to claim 15, further comprising an output module, wherein the output module corresponds to the image acquisition device in a one-to-one correspondence, the output module is integrated into a corresponding image acquisition device and electrically connected to the controller, and the output module is used to output the determination result of the controller.

17. A vehicle wheels alignment method applied to the vehicle wheels alignment system according to claim 1, wherein the method comprises steps of: receiving a motion parameter signal comprising position change information of the image acquisition sensor sent by the failure sensor while controlling the image acquisition device to detect the vehicle;

and determining whether the position of the image acquisition sensor needs to be calibrated according to the motion parameter signal, and if so, executing an intervention treatment.

18. The vehicle wheels alignment method according to claim 17, wherein determining whether the position of the image acquisition sensor needs to be calibrated, and if so, executing an intervention treatment, comprises: executing a first intervention treatment when the motion parameter signal is greater than a first preset threshold.

\* \* \* \* \*